United States Patent [19]
Koenig et al.

[11] 3,732,353
[45] May 8, 1973

[54] MOISTURE SEAL AND FIRE BARRIER FOR ELECTRICAL BUS DUCT

[75] Inventors: Martin F. Koenig, Milwaukee, Wis.; Manuel Issa, deceased, late of Milwaukee, Wis. by Patrick T. Sheedy, administrator

[73] Assignee: Cutler-Hammer, Inc., Milwaukee, Wis.

[22] Filed: Mar. 22, 1972

[21] Appl. No.: 237,025

[52] U.S. Cl. .............................. 174/68 B, 174/99 B
[51] Int. Cl. .............................................. H02g 5/06
[58] Field of Search ................ 174/16 B, 68 B, 70 B, 174/71 B, 72 B, 88 B, 99 B, 99 E, 100; 339/22 B

[56] References Cited

UNITED STATES PATENTS

| | | | |
|---|---|---|---|
| 3,187,086 | 6/1965 | Moodie et al. | 174/68 B |
| 3,365,537 | 1/1968 | Fehr, Jr. et al. | 174/88 B |
| 3,401,230 | 9/1968 | Giger, Jr. | 174/99 B X |
| 3,639,676 | 2/1972 | Dempsey, Jr. et al. | 174/68 B |

FOREIGN PATENTS OR APPLICATIONS 1,005,259   9/1965   Great Britain ...................... 174/88 B

*Primary Examiner*—Laramie E. Askin
*Attorney*—John W. Michael et al.

[57] ABSTRACT

A sealing device, including a resilient sealing member interposed between a pair of retaining plates and a through bolt threadably mounted to a bowed metallic clamping member, is installed inside the ends of the hat sections of a bus duct above and below the edges of the bus bars. As the through bolt is tightened, the sealing member is squeezed into sealing engagement with the inside walls of the hat section to provide a moisture-proof seal and the edges of the clamping member bite into the inside walls of the hat section to secure the device in place and provide a metal-to-metal fire barrier.

12 Claims, 3 Drawing Figures

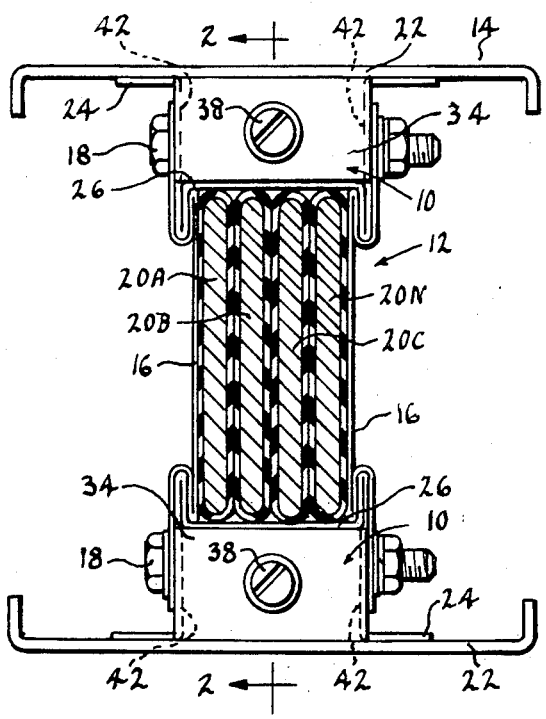
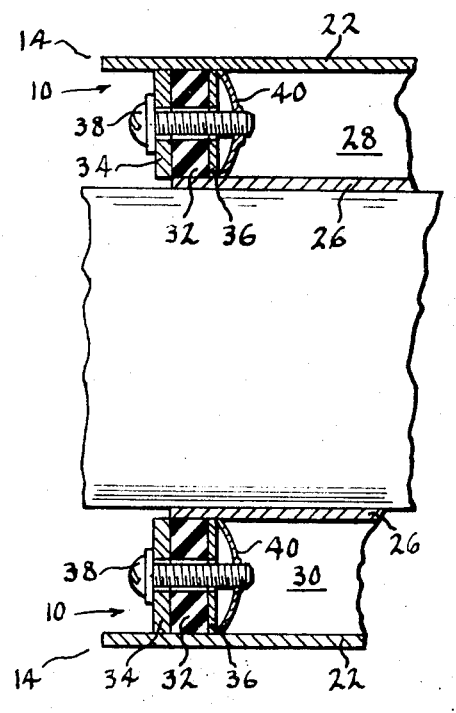
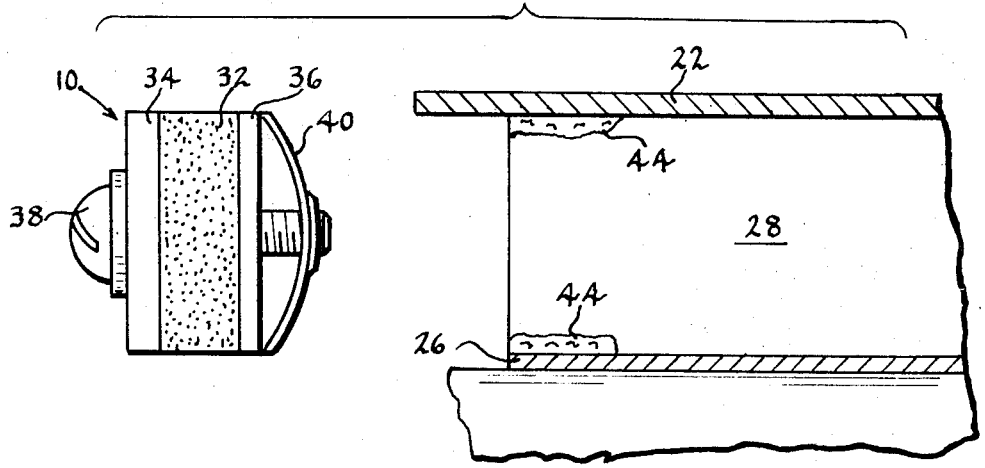

3,732,353

MOISTURE SEAL AND FIRE BARRIER FOR ELECTRICAL BUS DUCT

BACKGROUND OF THE INVENTION

This invention relates to electrical bus ducts and, more particularly, to means for providing a moisture-proof seal and a fire barrier therefor.

Electrical bus way systems employ a plurality of bus duct sections connected together end-to-end through joint assemblies. These bus ducts include a plurality of grouped, insulated bus bars enclosed in an elongated metallic housing. The bus ways are frequently installed at locations where they are exposed to weather or moisture from other sources. The presence of moisture or other liquids in the bus duct housing can create several potential problems. For instance, moisture or other liquids, combined with te heat normally generated within the duct housing during operation, can cause deterioration of the bus bar insulation, which eventually can lead to destructive arcing, fire and other damage. The duct sections are commonly disconnected and reconnected at another location after an initial installation. Therefore, both ends of each duct section should be provided with a sealing means which is capable of maintaining a moisture-proof seal after disconnection and reconnection of the duct sections.

Although the duct sections are provided with a moisture seal, there still is some risk of a fire developing inside the housing. The heat normally generated in the housing during operation is sufficient to ignite certain flammable materials, such as dust, which can accumulate in the housing. The temperature generated by such a fire is frequently high enough to destroy the resilient sealing materials typically used for moisture sealing members and the fire can then propagate through the bus way system. In order to restrict the fire to a localized area, it is highly desirable that each duct section include some means for preventing a fire from spreading therefrom.

Various means have been proposed for sealing bus ducts against the entrance of moisture or other liquids. For example, U.S. Pat. No. 3,365,537 describes a sealing device comprised of an insulating block and gasketing arrangement which is installed inside each end of the bus duct housing between the edges of the bus bars and the housing walls. Although reasonably adequate as a moisture seal, this sealing device has limited capability as a fire barrier. The device is held in place with gasketing material which can be destroyed by fire and allow the fire to spread. Also, rising pressure produced by a fire in the duct housing can cause the device to "blow-out" from the end of the duct housing, thereby permitting the fire to spread. Furthermore, the sealing device is partially held in place by the cooperation of the joint assembly. Consequently, it can fall out of place during handling of the duct section during disconnection and reconnection.

U.S. Pat. No. 3,401,230 describes a molded member which is installed into the ends of the bus duct and is held in place by a bolt extending through the exterior side walls of the housing. In addition to being an inadequate fire barrier, the additional holes in the duct housing are potential points for the entrance of moisture or other liquids into the housing. U.S. Pat. No. 3,187,086 discloses use of a vulcanized fiber spool placed on the ends of the bus duct as a fire barrier. These spools do not provide an adequate seal against the entrance of moisture or other liquids.

SUMMARY OF THE INVENTION

A primary object of this invention is to provide a moisture-proof sealing means for electrical bus ducts which is also capable of acting as a fire barrier.

Another object of this invention is to provide such a means which, after installation, remains secured in place to provide a moisture-proof seal when the bus duct section is handled during connection, disconnection and reconnection.

According to this invention, a sealing device is provided which is arranged to fit inside the opposite ends of each chamber defined between the top and bottom edges of the bus bars and the bus duct housing. The sealing device includes a resilient sealing member having outer edges adapted to seat against the inside surfaces of the walls defining the chamber and a metallic clamping member overlying the backside of the sealing member, which is positioned inside the chamber when the sealing device is installed. Actuation means, cooperating with the clamping member, moves the clamping member into compressive engagement with the sealing member to urge its outer edges into moisture-sealing engagement with the inside surfaces of the chamber walls. The clamping member extends between the chamber walls to provide a metallic fire barrier.

The clamping member is preferably arranged so that movement of the actuation means causes at least two of the opposite edges of the clamping member to bite into corresponding chamber walls to secure the sealing device in place. This permits the bus duct to be connected, disconnected and reconnected without affecting the moisture seal provided by the sealing device. In a preferred embodiment, the actuation means comprises a bolt extending through the sealing member and threadably mounted to the clamping member which is bowed. Tightening of this bolt moves the clamping member into compressive engagement with the sealing member to urge the outer edges of the sealing member into moisture-sealing engagement with the chamber walls and flattens the bowed sealing member to provide the above-described biting action.

BRIEF DESCRIPTION OF THE DRAWINGS

FIG. 1 is an end view of an electrical feeder bus duct shown with a pair of sealing devices of this invention installed.

FIG. 2 is a fragmentary, longitudinal sectional view taken along the plane designated 2—2 in FIG. 1.

FIG. 3 is an enlarged fragmentary, sectional view of the top portion of a bus duct with the sealing device shown in position ready for installation.

DESCRIPTION OF THE PREFERRED EMBODIMENT

Referring to FIG. 1 a pair of sealing devices 10 of this invention are shown installed into one end of a feeder bus duct section 12. A pair of sealing devices are installed in each end of the bus duct, so a total of four are used for each duct section.

Duct section 12 is arranged in a conventional manner, preferably in the manner described in U.S. Pat. No. 3,639,676, assigned to the assignee of the present invention. Duct section 12 is comprised of a bolt-together metallic housing having top and bottom channel assemblies 14 joined to a pair of side members 16 by bolts 18 to define an elongated central chamber which contains a plurality of wide, flat bus bars 20A, 20B, 20C and 20N. The bus bars are individually insulated in a suitable manner and are arranged tightly together with the flat sides juxtaposed to stand on edge within the central chamber.

Each channel assembly 14, which are identically constructed, has an exterior channel 22 to which an elongated, U-shaped cap member 24 is attached. Edge cap member 24 includes a lateral bight section 26, against which the edges of the bus bars are seated. Thus, the housing is divided into a central chamber containing the bus bars and two smaller chambers or hat sections 28, 30 above and below the central chamber, respectively. It should be appreciated that the application of the sealing device of this invention is not limited to bus ducts of this form, but can also be used for bus ducts which do not include a bight section 26, tie plate of a similar means positioned adjacent to the edges of the bus bar, as described below.

Sealing device 10 includes a sealing member 32, interposed between an outer retainer plate 34 and inner retainer plate 36, and a bolt 38 extending through the sealing member and the retainer plates, which is threaded into bowed clamping member 40. Sealing member 32 is constructed from a resilient sealing material, such as a rubber material or the like, and clamping member 40 is constructed from a relatively stiff spring metal which is harder than the metal of the bus duct housing. Sealing member 32 and inner retainer plate 36 are dimensioned to fit closely inside the walls of chambers 28, 30. The clamping member is formed so that, in the relaxed condition, its width is slightly less than the distance between the bight portion 26 and exterior channel 22, but is greater than this distance when compressed, i.e. flattened. Outer retainer plate 34 is longer than the inside dimension between the side walls 42 of edge cap member 24 so that it overlies the edge of the side walls when installed, as shown in FIG. 1.

As shown in FIG. 3, a bead of sealing material 44, such as a high-temperature, silicone adhesive material, is applied to each of the inside corners of the chambers 28, 30 prior to installation of sealing device 10. After the sealing device is installed into the ends of chambers 28, 30 with retainer plate 34 abutting the outer edge of side walls 42, 42, bolt 38 is tightened into clamping member 40. As the bolt is tightened, sealing member 32 is squeezed between the retainer plates into sealing engagement with side walls 42, the top side of bight section 26 and the under side of channel 22. Sealing material 44 is forced into crevices existing at the corners of the chambers 28, 30 and into voids which may exist between sealing member 32 and the walls defining the chambers to insure a complete moisture-proof seal. If the corners of the chambers do not have crevices (e.g. are rounded) or are otherwise configured so that sealing member can be squeezed into sealing engagement with all the chamber walls without voids therebetween, the use of sealing material 44 is not necessary to obtain a good seal. Further tightening of bolt 38 compresses (i.e. flattens) clamping member 40 so that the upper and lower edges bite into the underside of channel 22 and the top side of bight section 26, respectively. The sealing device is firmly secured inside the duct housing by this biting action of clamping member 40. Instead of the bowed arrangement shown, clamping member 40 can be bowed so that the outer ends bite into side walls 42, 42 or even bowed in a concave fashion so that all the edges bite into all of the chamber walls as it is flattened. Clamping member 40 also extends between side walls 42, 42 to act as a fire barrier. Since clamping member 40 is metallic, it remains intact, even when subjected to temperatures high enough to destroy sealing member 32, and thereby provides a metal-to-metal barrier to fire. Inner retainer plate is preferably also metallic to provide an additional barrier to a fire. Increasing internal pressure in chambers 28, 30 produced by a fire tends to flatten clamping member 40 further, thereby increasing its biting force and restraining the sealing device against a "blow-out".

When the sealing devices are used in bus ducts which do not have bight sections 26, tie plates or similar means positioned adjacent to the edges of the bus bars, clamping member 40 is bowed so its outer edges bite into side walls 42, 42. In this case, a bead of sealing material can be applied to the edges of the bus bars to insure a complete moisture proof seal. Also, the bottom edge of the clamping member can be scalloped to closely conform to the profile of the edges of the group bus bars to improve the mechanical fire barrier provided thereby.

From the above detailed description, it can be seen that the sealing device of this invention is simply arranged and, although capable of being easily and quickly installed, provides both a moisture-proof seal and a fire barrier. The sealing device is secured in place independent of the joint assembly. Therefore, handling of the bus duct sections during connection, disconnection and reconnection does not affect the moisture seal provided by the sealing devices. Also, the sealing devices are held in place without the use of additional external holes in the bus holding, which are potential moisture entrance points.

We claim:

1. An electrical bus duct comprising, in combination an open-end, elongated housing including first and second pairs of opposing walls;

a plurality of flat, elongated bus bars disposed in said housing and extending from end-to-end thereof, said bus bars being grouped together on edge with their flat sides juxtaposed and positioned with the opposite exterior flat sides of the group contiguous said first pair of opposing walls and the opposite edges of the group spaced from said second pair of opposing walls, respectively, to define a pair of chambers therebetween; and a separate sealing device fitting into the opposite ends of each of said chambers, each said sealing device comprising a moisture sealing means including a resilient sealing member having outer edges adapted to seat against the inside surfaces of said chamber, a metallic clamping member overlying the backside of said sealing member and positioned inside said chamber, and actuation means for moving said clamping member, after installation of said device into said chamber, into compressive engagement with said sealing member to urge the outer edges of said sealing member into moisture sealing engagement with the inside surfaces of said chamber, said clamping member extending between the walls defining said chamber to provide a metallic fire barrier.

2. The combination according to claim 1 wherein said clamping member has edges positioned adjacent to said chamber walls and is arranged so that said movement of the actuation means causes at least two of the opposite of said edges to bite into corresponding opposite inside walls defining said chamber to secure said device thereto.

3. The combination according to claim 2 wherein said clamping means comprises a bowed, resilient plate means which is flattened upon said movement of said actuation means to provide said biting action.

4. The combination according to claim 3 wherein said moisture sealing means includes an outer retainer plate means overlying the outer side of said sealing member and an inner retainer plate means overlying the backside of said sealing member which is interposed between said sealing member and said resilient plate means; and said actuation means comprises a bolt means, extending through both of said retainer plate means and said sealing member and threadably mounted to said resilient plate means, which, upon tightening, cooperates with said resilient plate means to compress said sealing member between said retainer plate means and urge the edges of said sealing member into sealing engagement with the inside surfaces of said chamber and flattens said resilient plate means to provide said biting action.

5. The combination according to claim 4 wherein the ends of said outer retainer plate means abut a portion of the outer edges of said first pair of opposing walls.

6. The combination according to claim 5 wherein said housing includes a third pair of opposing walls extending between said first pair of opposing walls adjacent to the opposite edges of the group of bus bars respectively to define said chamber.

7. The combination according to claim 6 including resilient sealing material disposed inside said chamber between each corner thereof defined by said first, second and third walls and said sealing member.

8. An electrical bus duct comprising, in combination an open end, elongated housing including first and second pairs of opposing walls;

a third pair of opposing walls extending between said first pair of walls and spaced from said second pair of walls to define a first central chamber and a pair of second chambers between respective of said second and third walls;

a plurality of flat elongated bus bars disposed in said central chamber;

a separate sealing device fitting into the opposite ends of said second chambers, each said sealin device comprising a moisture sealing means including a resilient sealing member having outer edges adapted to seat against the inside surfaces of the walls defining said second chamber;

a metallic clamping member overlying the backside of said sealing member and positioned inside said second chamber; and actuation means for moving said clamping member, after installation into said second chamber, into compressive engagement with said sealing member to urge the outer edges of said sealing member into moisture sealing engagement with the inside surfaces of the walls defining said second chamber said clamping member also extending between the walls defining said second chamber to provide a metallic fire barrier.

9. The combination according to claim 8 wherein said clamping member has edges positioned adjacent to said second chamber walls and is arranged so that said movement of the actuation means causes at least two of the opposite of said edges to bite into corresponding opposite inside walls defining said second chamber to secure said device thereto.

10. The combination according to claim 9 wherein said clamping means comprises a bowed, resilient plate means which is flattened upon said movement of said actuation means to provide said biting action.

11. The combination according to claim 10 wherein said moisture sealing means includes an outer retainer plate means overlying the outer side of said sealing member and an inner retainer plate means overlying the backside of said sealing member which is interposed between said sealing member and said resilient plate means; and said actuation means comprises a bolt means, extending through both of said retainer plate means and said sealing member and threadably mounted to said resilient plate means, which, upon tightening, cooperates with said resilient plate means to compress said sealing member between said retainer plate means and urge the edges of said sealing member into sealing engagement with the inside surfaces of the walls defining said second chamber and flattens said resilient plate means to provide said biting action.

12. The combination according to claim 11 wherein the ends of said outer retainer plate means abut a portion of the outer edges of said first pair of opposing walls.

* * * * *